United States Patent [19]
Brazas et al.

[11] Patent Number: 5,689,492
[45] Date of Patent: Nov. 18, 1997

[54] ASSEMBLY USED FOR PRECISELY POSITIONING THE COMPONENT PARTS OF A LASER DETECTOR GRATING UNIT (LDGU)

[75] Inventors: John C. Brazas, Hilton; David A. Roberts; Robert J. Schomske, both of Rochester, all of N.Y.

[73] Assignee: Eastman Kodak Company, Rochester, N.Y.

[21] Appl. No.: 693,033

[22] Filed: Aug. 6, 1996

[51] Int. Cl.⁶ .................................................. G11B 7/135
[52] U.S. Cl. .................. 369/112; 369/44.12; 369/44.23; 369/122
[58] Field of Search .................. 369/44.12, 44.23, 369/112, 122, 44.14; 250/201.5, 237 G, 231.16

[56] References Cited

U.S. PATENT DOCUMENTS

| | | | |
|---|---|---|---|
| 4,945,529 | 7/1990 | Ono et al. | 369/109 |
| 5,050,153 | 9/1991 | Lee | 369/112 |
| 5,361,244 | 11/1994 | Nakamura et al. | 369/44.12 |
| 5,491,675 | 2/1996 | Kay | 369/44.23 |
| 5,511,059 | 4/1996 | Brazas | 369/109 |
| 5,513,121 | 4/1996 | Sugawara et al. | 369/44.12 |
| 5,534,693 | 7/1996 | Kondo et al. | 250/237 |
| 5,544,143 | 8/1996 | Kay et al. | 369/109 |
| 5,581,523 | 12/1996 | Seki et al. | 369/44.12 |
| 5,602,383 | 2/1997 | Takekoshi et al. | 369/44.12 |

OTHER PUBLICATIONS

W. Ophey, "Compact Optical Light Paths," Jpn. J. Appl. Phys., vol. 32, Part 1, No. 11B, pp. 5252–5257, Nov. 1993.

*Primary Examiner*—David C. Nelms
*Assistant Examiner*—Kim-Kwok Chu
*Attorney, Agent, or Firm*—Raymond L. Owens

[57] ABSTRACT

An optical system including an LDGU having a multi-element grating beam splitter and an optical source with an effective aperture for generating a radiation beam to be applied to a data track of an optical storage medium, an improved LDGU is described. The LDGU includes a baseplate having a plurality of registration pins and defining a plurality of clearance holes; a body having a ring portion which defines a central opening and having a plurality of registration openings; a ceramic header defining alignment openings and having a plurality of contact pins which are aligned to the clearance holes of the baseplate; at least two of the registration pins of the baseplate being aligned in the registration openings in the body and at least two of the registration pins being aligned in the alignment openings in the ceramic header; and a structure for mounting the grating beam splitter and the optical source on the ceramic header.

3 Claims, 3 Drawing Sheets

ASSEMBLY USED FOR PRECISELY POSITIONING THE COMPONENT PARTS OF A LASER DETECTOR GRATING UNIT (LDGU)

CROSS-REFERENCE TO RELATED APPLICATIONS

Reference is made to U.S. patent application Ser. No. 08\671,852 filed Jun. 28, 1996 entitled "Multi-Element Grating Beam Splitter in an Optical Recording Device Providing Uniform Beam Splitting Efficiency" and U.S. patent application Ser. No. 08\674,225 filed Jun. 28, 1996 entitled "Improved Beam Splitter for Optical Recording", the disclosures of these related applications are incorporated herein by reference.

FIELD OF THE INVENTION

The present invention relates generally to optical read/write heads used in optical information storage and retrieval systems. More particularly, the present invention relates to precisely positioning the component parts of a laser-detector-grating unit (LDGU).

BACKGROUND OF THE INVENTION

In many optical information storage and retrieval systems, a radiation beam from an optical source is reflected and diffracted from a data track on an optical storage medium. The beam returning from the storage medium may be directed to a detector array that provides signals used to generate, for example, a focus error signal (FES), a tracking error signal (TES) and a data signal. The FES and TES generally drive servo systems for maintaining the radiation beam in-focus and on-track, respectively, relative to the storage medium. The data signal is indicative of the data stored on the data track scanned by the radiation beam. The portion of the optical system which generates and processes the radiation beam is generally referred to as an optical head.

The stability of an optical head is usually improved by decreasing the distance between certain critical components, such as an optical source, beam splitter and detector array. In addition, the cost and complexity of the optical head is reduced if these components are integrated into a single package. A known technique for accomplishing these objectives involves combining components such as an optical source, a grating beam splitter and a detector array into an integrated package generally referred to as a laser-detector-grating unit (LDGU). LDGUs are also known, as laser/detector optical heads and hologram laser units. Optical systems which incorporate an LDGU or a similar device will be referred to herein as LDGU-based systems. A number of exemplary LDGU-based systems are described in W. Ophey, "Compact Optical Light Paths," Jpn. J. Appl. Phys., Vol. 32, Part 1, No. 11B, pp. 5252–5257, November 1993. Other LDGU-based systems are described in, for example, U.S. Pat. Nos. 5,050,153 and 4,945,529. An exemplary optical head in accordance with U.S. Pat. No. 4,945,529 includes a diffraction grating with four grating regions. The four grating regions direct portions of a reflected and diffracted radiation beam to a detector assembly in order to generate an FES, a TES and a data signal.

Existing LDGUs also typically have an inherently low throughput efficiency, due in part to the fact that the radiation beam is generally not circularized. A circularized radiation beam is rotationally symmetrical about its optical axis. Throughput efficiency may be defined in terms of a percentage of optical source radiation which is transferred to the surface of the optical storage medium. Currently available LDGUs used for reading optical discs have throughput efficiencies on the order of only about 10%, with a considerable amount of the optical source output lost in the grating beam splitter and in truncating the non-circularized radiation beam. Although LDGUs are now commonly used for read-only applications such as compact disc (CD) players, the problems of source noise and low throughput efficiency have limited the usefulness of LDGUs in higher power applications such as optical recording.

In addition, some LDGU designs exhibit excessive optical cross-talk between tracking and focus signals. The optical cross-talk originates from, for example, diffracted radiation components and optical wavefront aberrations in the return beam. The presence of optical cross-talk may limit the effectiveness of LDGUs in certain optical systems, particularly those systems which utilize high performance focus and tracking servomechanisms. U.S. Pat. No. 5,406,541 reduces the effect of cross-talk in optical heads by implementing an orthogonality condition between the focus and tracking sensors, it does so by using separate optical paths for generating the focus and tracking signals. The need for additional components to create and process separate optical paths adversely affects the cost and complexity of the optical head.

If the vertical separation between the detector and the grating beam splitter is incorrect the diffracted components of an in focus and on track return beam will not be brought to focus in the plane of the detector assembly. In order to optimize the focus error, tracking error and data signals in an LDGU it is therefore important to precisely position the component parts of the LDGU.

SUMMARY OF THE INVENTION

It is an object object of the present invention to provide a mechanical assembly which precisely positions the component parts of an LDGU and reduces the difficulty of the assembly and minimizes the above noted problems.

It is a further object of the present invention to provide an LDGU that is well-suited for use in optical recording applications and that exhibits reduced sensitivity to changes in the wavelength of the laser and in the ambient temperature.

It is a still further objective to reduce optical cross-talk without requiring additional optical components.

These objectives are achieved by an optical system including an LDGU having a grating beam splitter and an optical source with an effective aperture for generating a radiation beam to be applied to a data track of an optical storage medium, an LDGU mounting means comprising:

a) a baseplate having a plurality of registration pins and defining a plurality of clearance holes;

b) a body having a ring portion which defines a central opening and having a plurality of registration openings formed in the ring portion;

c) a ceramic header defining alignment openings and having a plurality of contact pins that are aligned in the clearance holes of the baseplate;

d) at least two of the registration pins of the baseplate being aligned in the registration openings in the body and at least two of the registration pins being aligned in the alignment openings in the ceramic header; and e) means for mounting the detector array and the optical source on the baseplate.

ADVANTAGES

The present invention provides the following advantages:

i) the ceramic header can be machined to permit precise alignment of the laser with respect to the detector array;

ii) the baseplate that serves as a support for the component parts of the LDGU and in addition acts as an additional heatsink for the laser;

iii) the removable body is removable and provides the capability to disassemble the LDGU and to then replace a defective laser. The body also defines the vertical separation between the laser and the grating element; and iv) a cap that provides mechanical support for the grating beam splitter. The cap is designed to permit fine adjustments to be made to the position of the grating beam splitter relative to the position of the optical source.

DETAILED DESCRIPTION OF THE PREFERRED EMBODIMENTS

Figure 1:
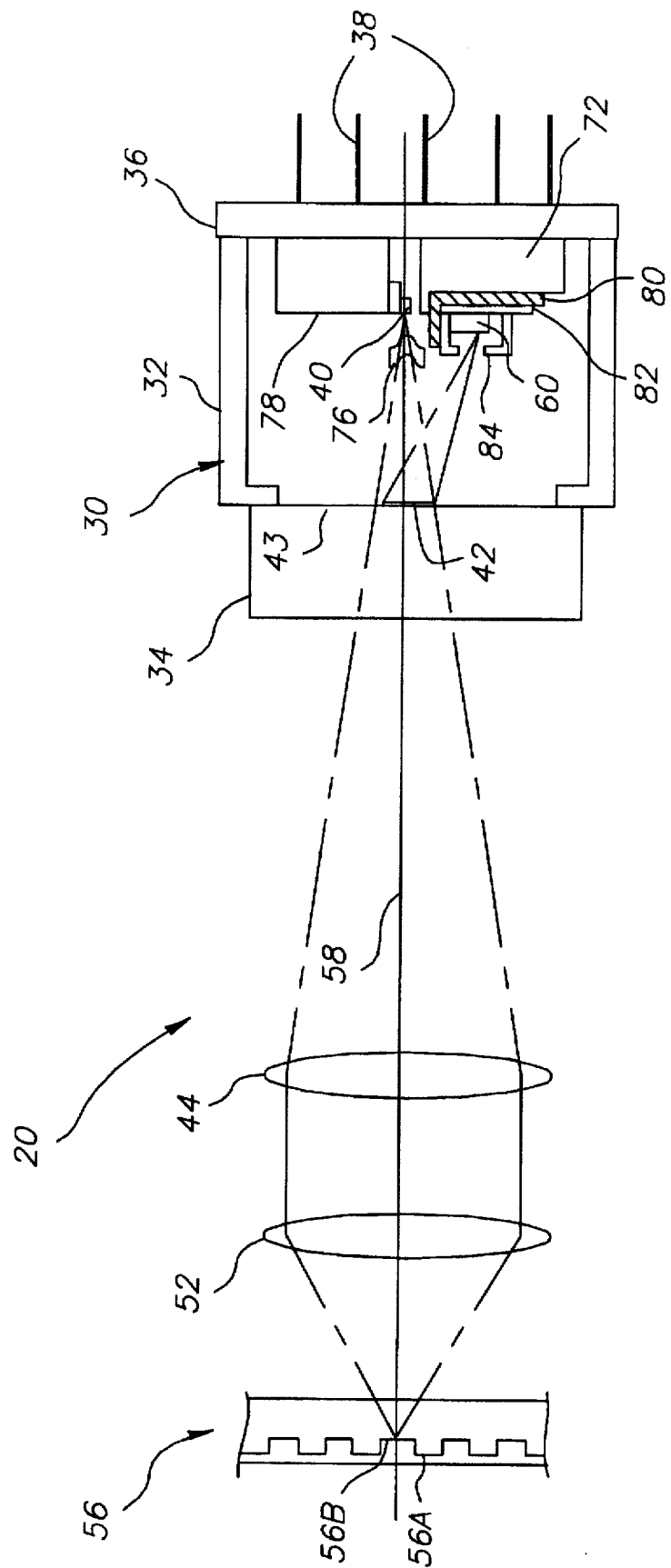
FIG. 1 shows a cross sectional view of the LDGU and the optical system.

FIG. 1 shows an exemplary optical system 20 in accordance with the present invention. The components of optical system 20 which process, direct and detect the return beam to provide the FES and TES, and in some cases a data signal, may be collectively referred to as a focus and tracking sensor system. Furthermore, although the present invention is particularly well-suited for use in optical read/write heads, it may also provide advantages in other optical applications, including, for example, position sensors.

The optical system 20 includes an LDGU 30 which may be used in an optical read/write head to both read from and write to optical storage media such as recordable CDs. The LDGU 30 combines several components into a single package. The LDGU 30 includes a body 32, a transparent substrate 34, and a baseplate 36. The baseplate 36 serves as a support for LDGU components and also provides a heatsink for the laser. The body is removable to provide the capability to disassemble the LDGU and replace a defective laser. The transparent substrate 34 may be glass, plastic, or other transparent material. A number of contact pins 38 protrude from the baseplate 36 for connecting the LDGU 30 to external electronic circuitry (not shown). The LDGU 30 also includes an optical source 40 which is typically a semiconductor laser diode. The optical source 40 generates a radiation beam which is incident on a grating beam splitter 42 formed on an inner surface 43 of the transparent substrate 34. The optical source 40 includes an effective aperture which is well known to those skilled in the art and can be considered to be a point source. The grating beam splitter 42 is preferably a blazed grating beam splitter.

The transparent substrate 34 is arranged between the optical source 40 and an optical storage medium 56 such that the radiation beam passes through the substrate. A zeroth order diffraction component of the radiation beam passes undeflected through the transparent substrate 34 and the grating beam splitter 42 formed thereon and is collimated by collimating lens 44. The radiation beam is then focused by an objective lens 52 onto an optical storage medium 56, which may be, for example, a recordable CD. Only a portion of the optical storage medium 56 is shown in FIG. 1. The radiation beam is used to store and retrieve information from the optical storage medium.

Any of a number of well known techniques may be used to form the blazed grating beam splitter 42 on the transparent substrate 34. For example, appropriate grating patterns could be photolithographically formed in a layer of photoresist on a surface of transparent substrate 34, an ion milling beam could be used to mill the grating patterns onto the transparent substrate 34, or the grating patterns could be formed using molded clear epoxy or resins. In addition, the grating beam splitter could be formed using holographic techniques, in which, for example, two or more laser beams are used to create an interference pattern in a thin layer of photoresist. These and other grating formation techniques are well known in the art and will not be further described herein. Furthermore, although the grating beam splitter 42 is shown in LDGU 30 on an inner surface of transparent substrate 34, it could also be formed on an outer surface of the substrate, or partially formed on both inner and outer surfaces of the substrate. It may be preferable in many applications, however, to form the grating beam splitter 42 on an inner surface in order to protect it from contaminants.

The optical storage medium 56 includes an optical storage medium surface 56A having a number of data tracks formed thereon. Each data track 56B is shown in cross-section and generally extends in a direction perpendicular to the plane of the drawing. The data track 56B is a type of diffraction component-generating structure. The structure diffracts the incident radiation beam because the depth of the structure is generally a fraction of the wavelength of the incident radiation beam and introduces phase differences in the return beam. Although the data track 56B is shown as a raised structure in the exemplary optical system 20 of FIG. 1, a data track in accordance with the present invention may also be, for example, a groove in the storage medium, a region between two grooves in the optical storage medium 56, a series of unconnected raised regions, or other optical path structures of appropriate dimension and refractive index such that diffraction patterns are created in response to an incident radiation beam.

It should be noted that although the data tracks are generally arranged in a spiral configuration on an optical storage medium such as a recordable CD, a given portion of the data track 56B around a point currently illuminated by the incident radiation beam will exhibit little curvature and therefore such a portion may be considered substantially straight. A projection of such a portion of data track 56B on the grating beam splitter 42 will generally lie in a plane separating part of the grating beam splitter 42 into first and second grating elements. A dashed line 58 is drawn in FIG. 1 between a currently illuminated data track 56B and the center of the optical source 40. The line 58 represents an optical axis of the incident radiation beam and is perpendicular to the data track 56B and the projection thereof onto grating beam splitter 42.

The data track 56B reflects and diffracts the incident radiation beam applied thereto. The reflected and diffracted incident radiation beam will be referred to herein as a return beam. The return beam is then incident on the grating beam splitter 42, which separates the return beam by principles of diffraction into a number of different portions. These portions are directed towards a detector array 60. The detector array 60 detects the various portions of the return beam and generates signals which, when combined in the manner described below, provide a TES, an FES and a data signal.

Figure 2:
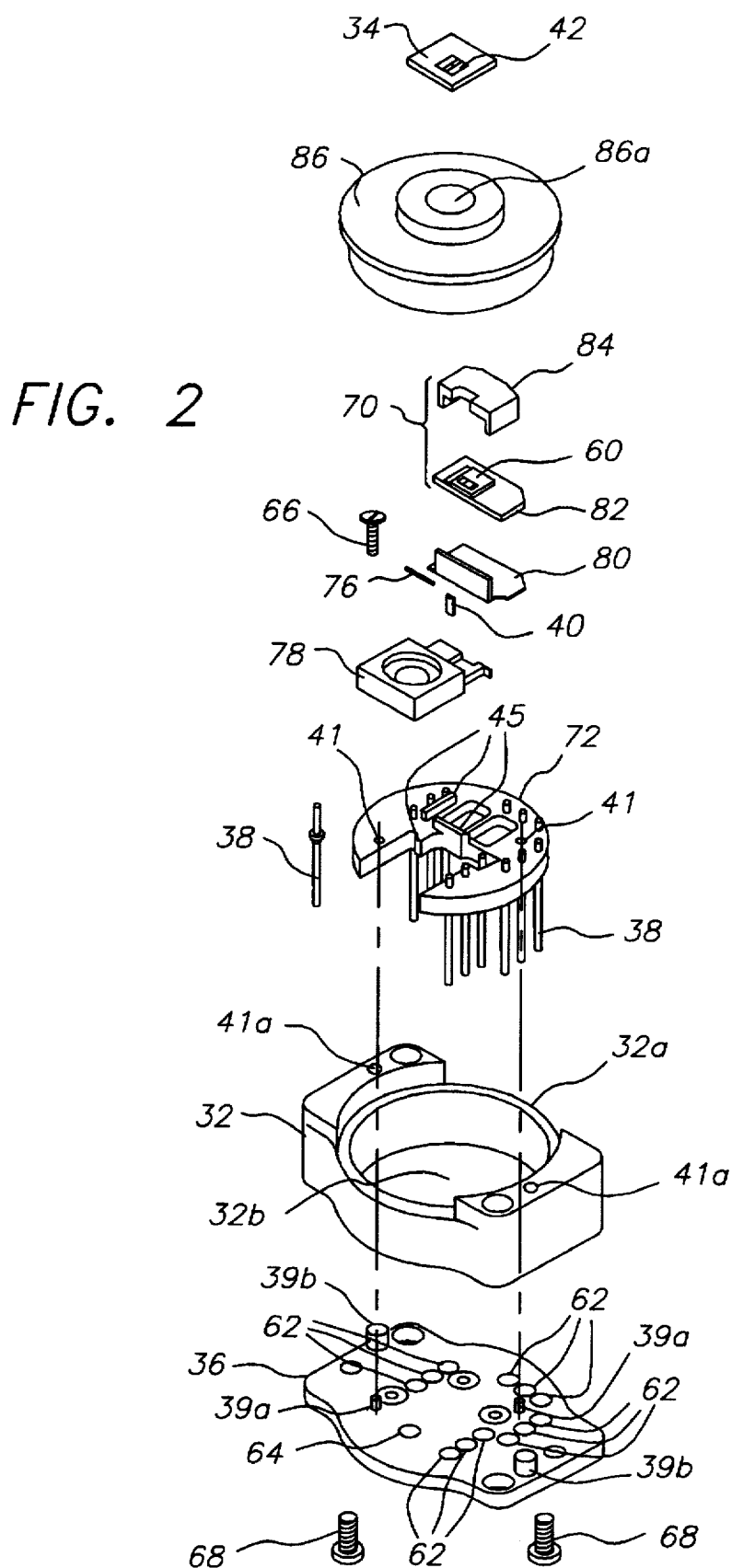
FIG. 2 shows an exploded view of the LDGU.

FIG. 2 shows an exploded view of the LDGU 30. The baseplate 36 is provided to support the components and to act as an additional heatsink for the optical source 40. The baseplate 36 is machined from aluminum and typically has a black anodized finish. There are clearance holes 62 for the contact pins 38 and a threaded hole 64 for the mounting screw 66 that secures the heatsink 78. Three holes are provided to permit excess epoxy to over flow. The remaining clearance holes are used to align and attach the LDGU 30 to the optical system 20. The baseplate 36 has four registration pins that are an integral part of its top surface. The pins are used to align the baseplate 36 to the ceramic header 72 and to the body 32 of the LDGU 30. More particularly, two of the registration pins 39a are used to align the baseplate 36 to the alignment openings 41 on a ceramic header 72 and the other two registration pins 39b are used to align the baseplate 36 to the registration openings 41a in the body 32. The body 32 has a ring shaped portion 32a which defines a central opening 32b. The body 32 itself includes a plurality of registration openings 41a. The body 32 provides support for the cap 86 and affords environmental protection for the optical source 40 and the detector sub-assembly 70.

The ceramic header 74 has a plurality of registration surfaces 45 that are used to achieve the required mechanical alignment of the optical source 40 and the detector sub-assembly 70. These surfaces can be machined to permit precise alignment of the laser with respect to the detector array. In the preferred embodiment the optical source 40 is mounted on a standard heatsink 78. The heatsink 78 is attached to the baseplate 36 with mounting screw 66. The term "heatsink" refers to a mount which supports the optical source used in a LDGU and is well understood in the art. An example of such a mount is the "Open Heatsink Package" manufactured by Spectra Diode Laboratories, Inc., of San Jose, Calif. The astigmatism and ellipticity of the optical source 40 is corrected using the micro-lens 76. The micro-lens 76 is manufactured by Blue Sky Research and is mounted on the heatsink 78 using either epoxy or solder. The micro-lens 76 is a critical component as it increases the percentage of the optical power delivered to the optical storage medium 56.

The ceramic header 74 and the baseplate 36 are designed to accommodate a plurality of contact pins 38. The contact pins 38 are supplied by Mill-Max Inc. of Oyster Bay, N.Y. and are plated with nickel and gold. The detector array 60 requires connections to seven contact pins 38. Another two contact pins are needed for making connections to the optical source 40. The contact pins 38 are bonded to the ceramic header 72 using epoxy.

The aluminum shield 80, shown in FIG. 2, is included to screen the detector array 60 from the forward propagating optical beam. The shield 80 is also used as a spacer layer to adjust the vertical separation between the optical source 40 and the top of the detector array 60. The detector subassembly 70, shield 80, ceramic header 72 and baseplate 36 were bonded together using epoxy. Suitable epoxies include the H61 and H74 epoxies manufactured by Epoxy Technology Inc. of Billerica Mass. After a number of units had been fabricated it was possible to calculate the mean thickness of the epoxy at each bond line. The thickness of the shield 80 was then adjusted to compensate for the total thickness of the epoxy.

The detector sub-assembly 70 is supplied by UDT and comprises a ceramic sub-mount 82, the detector array 60 and an opaque plastic cover 84. The ceramic sub-mount 82 is patterned with screen printed gold tracks. Wire bonds connect the detector array 60 to the tracks on the ceramic sub-mount 82 The opaque plastic cover 84 is designed to prevent scattered radiation from reaching the detector array 60.

Accurate positioning of the optical source 40, with respect to the detector array 60 is achieved through the use of the machined registration surfaces 45 on the ceramic header 72. The heatsink 78 and the optical source 40 are placed onto the baseplate 36 and pushed up against the ceramic header 72. The heatsink 78 is then held in place with the mounting screw 66. Electrical connections between the heatsink 78 and the contact pins 38 are made with aluminum or gold wire bonds. The body 32 can be attached to the baseplate 36 using the countersink screws 62. The advantage of having two separate pieces for the body 32 and the baseplate 36 is that the unit can easily be taken apart to either change the optical source 40 or to repair the wire bonds.

The cap 86 is secured to the top of the ring portion 32a of the body 32 of the LDGU by an adhesive and provides support for the transparent substrate 34 and the grating element 42. The cap 86, which includes an opening 86a, is designed so that the distance between the grating beam splitter 42 and the top surface of the detector array 60 can be precisely adjusted. This is advantageous because it makes it possible to optimize the vertical separation between the grating beam splitter and the detector array 60 thereby maximizing detector signals. The transparent substrate 34, is secured to the cap 86 with an adhesive such as such as UV curable epoxy.

The cap 86 not only supplies mechanical support for the grating beam splitter 42, but also permits fine adjustments to be made to position the grating beam splitter 42 relatiave to the positoin of the optical source 40.

Figure 3:
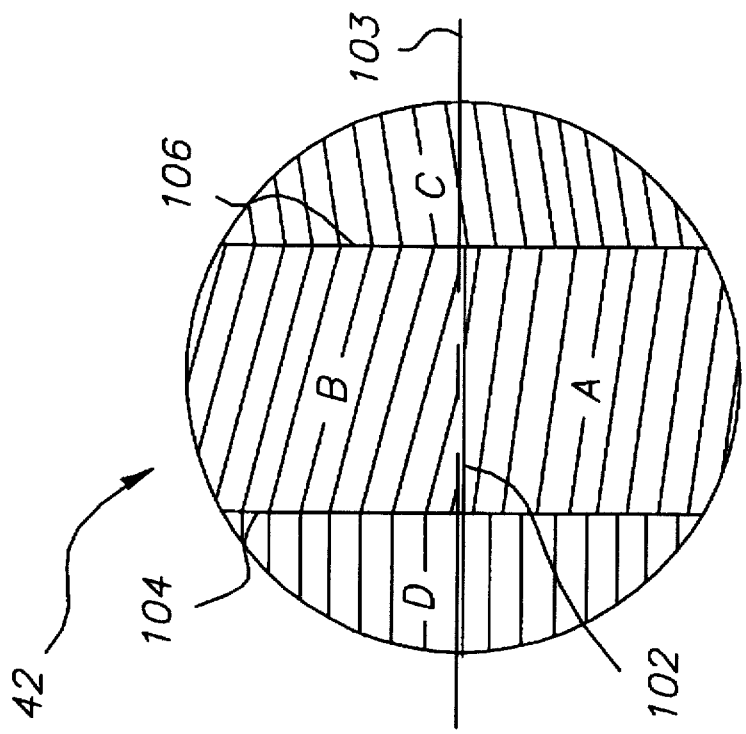
FIG. 3 shows the elements of the grating beam splitter.

FIG. 3 shows a detailed view, in a plane parallel to the plane of section 2—2, of an exemplary blazed grating beam splitter 42 in accordance with the present invention. The exemplary blazed grating beam splitter 42 includes first, second, third and fourth grating elements A, B, C and D, respectively. In a preferred embodiment of the present invention, the grating elements A, B, C and D of the grating beam splitter 42 are blazed gratings. Blazed gratings are commonly used in optical systems and their operation and high efficiency properties are generally well known. In alternative embodiments, other types of gratings could be used, including, for example, sinusoidal gratings, ruled gratings and holographic structures. Each grating element includes a grating pattern as shown in FIG. 3. The line spacings, line widths, blaze angles, and other dimensions of the grating patterns in each grating element may vary depending upon the application, and can be readily determined in a well known manner.

The first and second grating elements A and B of FIG. 3 are divided along a line 102 which is parallel to the above-described tangent to the data track 56B. The line 102 is also substantially parallel to a projection 103 of the tangent to the data track 56B onto the grating beam splitter 42, and lies in the reference plane defined by the optical axis 58 and the tangent to the data track 56B. The third and fourth grating elements C and D are arranged adjacent to and on opposite sides of the first and second grating elements A and B. The elements C and D are separated from elements A and B by lines 104 and 106, respectively, which are perpendicular to the data track 56B or the projection 103 of the data track 56B on the grating beam splitter 42. The grating elements A, B, C and D separate the return beam into four different portions, along planes which contain the lines 102, 104 and 106. The first and second grating elements A and B separate the return beam along the reference plane defined above. In other embodiments, the first and second grating elements could separate the return beam along another plane substantially parallel to the reference plane, or along two different planes substantially parallel to the reference plane. The third and fourth grating elements C and D separate the return beam along planes substantially perpendicular to the reference plane. In this exemplary embodiment, each of the resulting portions of the return beam is focused on a different detector in detector array 60.

Figure 4:
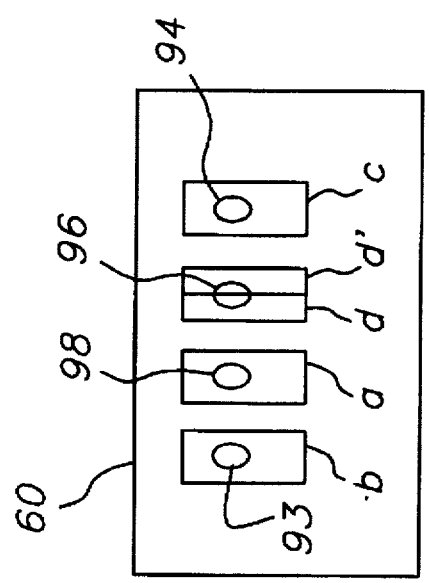
FIG. 4 shows the detector array.

FIG. 4 shows the exemplary detector array 60 in greater detail. The detector array 60 includes four detectors a, b, c and d,d', for detecting the first, second, third and fourth portions of the return beam, respectively. The fourth detector is a dual element detector with detector elements d and d'. In other embodiments, the third detector c may be a dual element detector rather than a single element detector. Each detector element may be, for example, a photodiode, a group of photodiodes, or another type of photodetector. Exemplary focus spots 93, 94, 96 and 98 indicate an area of each detector on which the first, second, third and fourth return beam portions, respectively, may be focused when the incident radiation beam is on-track and in-focus relative to the optical storage medium. It should be emphasized that this particular arrangement of detectors is exemplary only. For example, the detectors shown may include additional detector elements or fewer detector elements in other embodiments of the present invention. In addition, each of the detectors need not be part of a single detector array. As will be discussed in greater detail below, the grating elements and corresponding detector elements are arranged such that the optical cross-talk between tracking and focus signals is minimized.

In the exemplary embodiment of FIG. 3, the grating patterns shown are suitable for directing the first, second, third and fourth separated portions of the return beam onto detectors a, b, c and d, d', respectively, of detector array 60. It should be noted that the arrangement of grating elements shown in FIG. 3 is exemplary only and alternative embodiments of the present invention may utilize other arrangements. For example, the various elements of the grating beam splitter 42 may be separated by lines which deviate from the parallel or perpendicular lines shown in FIG. 3 by up to about ten percent. The terms "substantially parallel" and "substantially perpendicular," as used herein, include deviations of at least ten percent from parallel and perpendicular, respectively. Although the amount of optical cross-talk may increase as a result of such deviations, an improvement over most current prior art systems would generally still be obtained. In addition, although a four element grating beam splitter may be preferred in many applications, the grating beam splitter could include more or less than four grating elements. For example, an embodiment which does not require a data signal may include only the three grating elements A, B and C, or A, B and D.

In general, the return beam includes a reflected component, also referred to as a zeroth order diffraction component, and a number of higher order diffraction components diffracted by the surface of the optical storage medium. A given diffraction order generally includes both a positive and a negative diffraction component. Although higher order diffraction components may also be present in the return beam, the present invention can be readily understood without further consideration of diffraction components greater than first order. When the reflected component overlaps with the first order diffracted components, interference occurs. This interference may be directed to detectors a and b to provide, for example, a push-pull tracking error signal, as will be described below. The two first order diffraction components may be, for example, contiguous with an optical axis of the incident radiation beam, and therefore both may overlap with the reflected component. It should be noted, however, that the present invention may be utilized in systems in which the positive and negative diffraction components overlap with each other as well as with the reflected components. Additional detail regarding diffraction components may be found in, for example, the above-cited U.S. patent application Ser. No. 07/998,179, now U.S. Pat. No. 5,406,541, issued on Apr. 11, 1995, and pp. 172–179 of A. Marchant, "Optical Recording: A Technical Overview," Addison-Wesley, Reading, Mass., which are incorporated by reference herein.

A tracking error signal (TES) may be generated from the first and second portions of the return beam incident on the first and second detectors a and b, respectively, of the detector array 60. The TES is generated in accordance with the relationship a–b, which indicates that the signal generated by detector element b is subtracted from the signal generated by detector element a. As a result of passing through the above-described grating beam splitter 42, the first and second portions of the return beam each may include a different diffraction component of a given diffraction order, diffracted from the optical storage medium, as well as undiffracted components. The different diffraction component may be either a positive or a negative diffraction component. It should be understood that, in general, only part of any given diffraction component, rather than the entire component, falls within the objective lens aperture and will therefore be incident on grating beam splitter 42. References made herein to a particular diffraction component are thus meant to include any part of that component.

A focus error signal (FES) may be generated from the fourth portion of the return beam incident on the fourth detector d, d' of the detector array 60. A FES is generated in accordance with the relationship d–d', which indicates that the signal generated by detector element d' is subtracted from the signal generated by detector element d. As a result of passing through the above-described grating beam splitter 42, the third and fourth portions of the return beam include both positive and negative diffraction components of a given diffraction order, diffracted from the optical storage medium, as well as undiffracted components. Each of the detector elements d and d' thus receive both diffraction components of a given diffraction order. By subtracting the signals resulting from detection of the fourth portion of the return beam on detector elements d and d', the diffraction components of a given diffraction order substantially cancel out, thereby reducing optical cross-talk.

A data signal, indicative of the data stored on data track 56B, may also be generated in the optical system 20. For example, a data signal could be generated by combining the signals generated by each detector element in the detector array 60, in accordance with the relationship a+b+c+d+d'. Alternatively, signals from a subset of detector elements could be combined to generate a data signal.

Optical system 20 may also include electronic circuitry (not shown) for combining signals generated by the detector elements of detector array 60. The electronic circuitry may include adders, subtracters or other types of signal combiners for generating focus error, tracking error and data signals in accordance with the above-described relationships. Such electronic circuitry is generally well known in the art and will therefore not be further described herein.

In general, the orientation and location of the detector elements a and b is not critical to the operation of the present invention, and the arrangement in FIG. 4 or other alternative arrangements may be chosen in order to satisfy detector array packaging constraints or other criteria. The position of the fourth detector elements d and d' may also be varied but the division between the pair should generally be along a line substantially perpendicular to the data track 56B, or the projection 103 of the data track 56B on the grating beam splitter 42. This division line is also substantially perpendicular to the above-defined reference plane.

The grating beam splitter 42 of the present invention may be replaced with other optical devices capable of dividing the return beam reflected and diffracted from a data track into a number of distinct portions in accordance with the above description. Alternatives to the grating beam splitter 42 include, for example, holograms. In addition, as mentioned above, the grating or other optical device used to separate the return beam into its respective portions may include more or less than four elements. The elements could be suitably arranged to separate the return beam into portions which, when detected, generate signals which may be combined in accordance with the present invention such that optical cross-talk is minimized.

Although the foregoing detailed description has illustrated the present invention primarily in terms of a particular optical information storage and retrieval system, it should be understood that the embodiments described are exemplary only. Many variations may be made in the arrangements shown, including, for example, the type of grating beam splitter used to separate the return beam and the arrangement, shape and number of grating elements, the number of portions into which the return beam is separated, the arrangement of detectors and detector elements onto which the portions of the return beam are focused, and the type and arrangement of optical components for directing the incident and return radiation beams in the optical system. These and other alternatives and variations will be readily apparent to those skilled in the art, and the present invention is therefore limited only by the appended claims.

The invention has been described in detail with particular reference to certain preferred embodiments thereof, but it will be understood that variations and modifications can be effected within the spirit and scope of the invention.

Parts List

A,B,C,D grating elements
a,b,c,d,d' detectors
20 optical system
30 laser-detector-grating unit (LDGU)
32 body
32a ring shaped portion
32b central opening
34 transparent substrate
36 baseplate
38 contact pins
39 registration pins
40 optical source
41 alignment openings
41a registration openings
42 grating beam splitter
43 inner surface
44 collimating lens
45 registration surfaces
52 objective lens
56 optical storage medium
56A optical storage medium surface
56B data track
58 optical axis (dashed line)
60 detector array
62 clearance holes
64 threaded hole
66 mounting screw
68 countersink screws Parts List (con't)

70 detector sub-assembly
72 ceramic header
76 micro-lens
78 heatsink
80 shield
82 ceramic sub-mount
84 cover
86 cap
86a opening
93, 94, 96, 98 focus spots
102 line
103 projection
104, 106 lines

We claim:

1. In an optical system including an LDGU (Laser-Detector-Grating-Unit) having a grating beam splitter and an optical source with an effective aperture for generating a radiation beam to be applied to a data track of an optical storage medium, an LDGU mounting means comprising:

a) a baseplate having a plurality of registration pins and defining a plurality of clearance holes;
   b) a body having a ring portion which defines a central opening and having a plurality of registration openings formed in the ring portion;
   c) a ceramic header defining alignment openings and having a plurality of contact pins that are aligned in the clearance holes of the baseplate;
   d) at least two of the registration pins of the baseplate being aligned in the registration openings in the body and at least two of the registration pins being aligned in the alignment openings in the ceramic header; and
   e) means for mounting the detector array and the optical source on the baseplate.

2. The LDGU of claim 1 wherein the mounting means includes:

i) a heatsink for mounting the optical source;
   ii) means for mounting the heatsink to the baseplate; and
   iii) the detector array being mounted on the ceramic header.

3. The LDGU of claim 2 further including:

v) a shield mounted on the ceramic header, the detector array being secured to the shield; and
   vi) a cap for securing the grating beam splitter and being mounted on the ring portion of the body.

* * * * *